United States Patent
Belter

(10) Patent No.: US 6,893,024 B2
(45) Date of Patent: May 17, 2005

(54) BOLT RETENTION MECHANISM FOR MLS GASKET

(75) Inventor: Jerome G. Belter, Mount Prospect, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/339,512

(22) Filed: Jan. 9, 2003

(65) Prior Publication Data

US 2003/0102636 A1 Jun. 5, 2003

Related U.S. Application Data

(62) Division of application No. 09/992,506, filed on Nov. 21, 2001, now Pat. No. 6,533,287.

(51) Int. Cl.⁷ .................................................. F02F 11/00
(52) U.S. Cl. ........................................................ 277/598
(58) Field of Search ........................ 277/590, 592–598; 411/999, 970, 353

(56) References Cited

U.S. PATENT DOCUMENTS

| | | | |
|---|---|---|---|
| 2,439,306 A | | 4/1948 | Laidley |
| 2,639,832 A | | 5/1953 | Bergstrom |
| 4,196,913 A | * | 4/1980 | Oka ............................ 277/595 |
| 4,641,401 A | | 2/1987 | Hasegawa |
| 4,728,110 A | * | 3/1988 | Nakasone .................... 277/595 |
| 4,784,396 A | | 11/1988 | Scott et al. |
| 4,819,954 A | * | 4/1989 | Fucci et al. .................. 277/598 |
| 5,044,641 A | * | 9/1991 | Belter ......................... 277/598 |
| 5,269,541 A | | 12/1993 | Inamura |
| 5,344,165 A | * | 9/1994 | Miyaoh et al. .............. 277/595 |
| 5,544,902 A | | 8/1996 | Belter |
| 5,551,702 A | | 9/1996 | Inamura |
| 5,586,770 A | | 12/1996 | Udagawa et al. |
| 5,645,282 A | | 7/1997 | Belter |
| 5,673,920 A | | 10/1997 | Mockenhaupt |
| 5,690,342 A | * | 11/1997 | Tanaka et al. ............... 277/594 |
| 5,725,223 A | * | 3/1998 | Yamada et al. .............. 277/595 |
| 5,791,660 A | * | 8/1998 | Belter ......................... 277/598 |
| 5,979,906 A | * | 11/1999 | Silvian ........................ 277/593 |
| 6,076,833 A | * | 6/2000 | Geshi .......................... 277/595 |
| 6,189,895 B1 | * | 2/2001 | Yamada ....................... 277/591 |
| 6,227,785 B1 | | 5/2001 | Kilgore |
| 6,371,492 B1 | * | 4/2002 | Baron .......................... 277/637 |

* cited by examiner

*Primary Examiner*—Alison Pickard
*Assistant Examiner*—Vishal Patel
(74) *Attorney, Agent, or Firm*—Rader, Fishman & Grauer PLLC

(57) ABSTRACT

A bolt retainer mechanism in one layer of a multiple-layered steel (MLS) gasket, includes an aperture defining a radially inwardly extending tabs. In one embodiment, each tab is formed to define an inverted U-shaped tang positioned adjacent to, and in symmetrical registration with though axially spaced from, an associated mated aperture formed in a second layer of at least a two-layer gasket. Collectively, the plurality of tangs defines a circumscribed diameter slightly smaller than the diameter of the associated mated aperture, to assure retention of a bolt supported through the mated apertures for pre-assembly shipment. Preferably, the tangs in association with each of the mated apertures are formed of a spring metal adapted to provide radially inwardly directed forces against threaded shanks of associated bolts. To enhance effectiveness of bolt retention, the bolt-contacting portion of each U-shaped tab has an axial length greater than the axial thickness of the apertures.

20 Claims, 2 Drawing Sheets

BOLT RETENTION MECHANISM FOR MLS GASKET

This application claims priority from U.S. application Ser. No. 09/992,506 entitled "BOLT MECHANISM FOR MLS GASKET" filed Nov. 21, 2001, now U.S. Pat. No. 6,533,287, the disclosure of which is incorporated herein by reference.

BACKGROUND OF THE INVENTION

1. Field of the Invention

The present invention relates to improvements in the manufacture and assembly of bolted-on structures, such as automotive exhaust manifold gaskets of internal combustion engines. More particularly, the invention relates to improved gaskets having bolt apertures including unique spring structures for retaining bolt members in place on such gaskets prior to their installation in engines.

2. Description of the Prior Art

Those skilled in the art will appreciate the difficulty of assembling an exhaust manifold gasket between a cylinder head exhaust port of an internal combustion engine and an exhaust manifold flange normally secured thereto via bolts. Typically, the exhaust manifold gasket is placed on a radially inwardly directed flank or side of the engine. As a result, the manifold gasket must be applied to the engine at occasionally awkward angles, and thus can be quite difficult to assemble to the engine. In addition, the art of maintaining the gasket in place on the engine while attaching and securing the exhaust manifold thereto can be even more difficult.

One method has involved attaching and holding the gasket in place on the manifold prior to installation of the manifold. This approach has enjoyed limited success because typical methods of attachment of gaskets to the manifolds for shipment have included such items as clips in varied assortments and arrangements. Such clips often tend to break or become loose, and the gaskets often become detached during shipment.

Another method has involved securing the gasket to the manifold via bolts already at least partially secured in place to the manifold. This method has purported to reduce the number of components requiring handling, and thus has promised greater efficiency of assembly. However, the method has instead been relatively labor-intensive in that the bolts have had to be partially threaded within threaded apertures of the manifold. This effort has required manual rotary manipulation of each bolt for its proper securement. A better method would be the employment of a simple push-style insertion of each bolt into a manifold aperture. The resultant reduction in the labor burden would provide an attractive solution to noted issues of shipping, handling, and installation.

SUMMARY OF THE INVENTION

The present invention is a bolt retainer mechanism incorporating at least two tabs formed directly in a first bolt aperture of one layer of a multiple-layered steel (MLS) gasket. Each tab is formed to define an inverted U-shaped tang that extends adjacent to, and is in symmetrical registration with, while axially spaced from, an associated mated second aperture formed in the bottom layer of at least a two-layer gasket. Collectively, the plurality of such tangs define a circumscribed diameter slightly smaller than the diameter of the mated second aperture in order to ensure retention of a bolt through both aligned apertures of first and second gasket layers, particularly during pre-assembly shipment.

In one described embodiment, the tangs at each first aperture are formed of a spring metal and are adapted to provide radially inwardly directed forces against the threaded shanks of associated bolts for retention of the bolts under conditions of handling and vibration. Also, the bolt-contacting portion of each inverted U-shaped tab has an axial length greater than the two-layer axial thickness of the mated apertures. Thus, the depth of engagement afforded to the shank any given bolt by the inverse legs of the U-shaped tab is particularly effective to enhance retention of the bolt within the apertures.

DETAILED DESCRIPTION OF THE PREFERRED EMBODIMENTS

Figure 1:
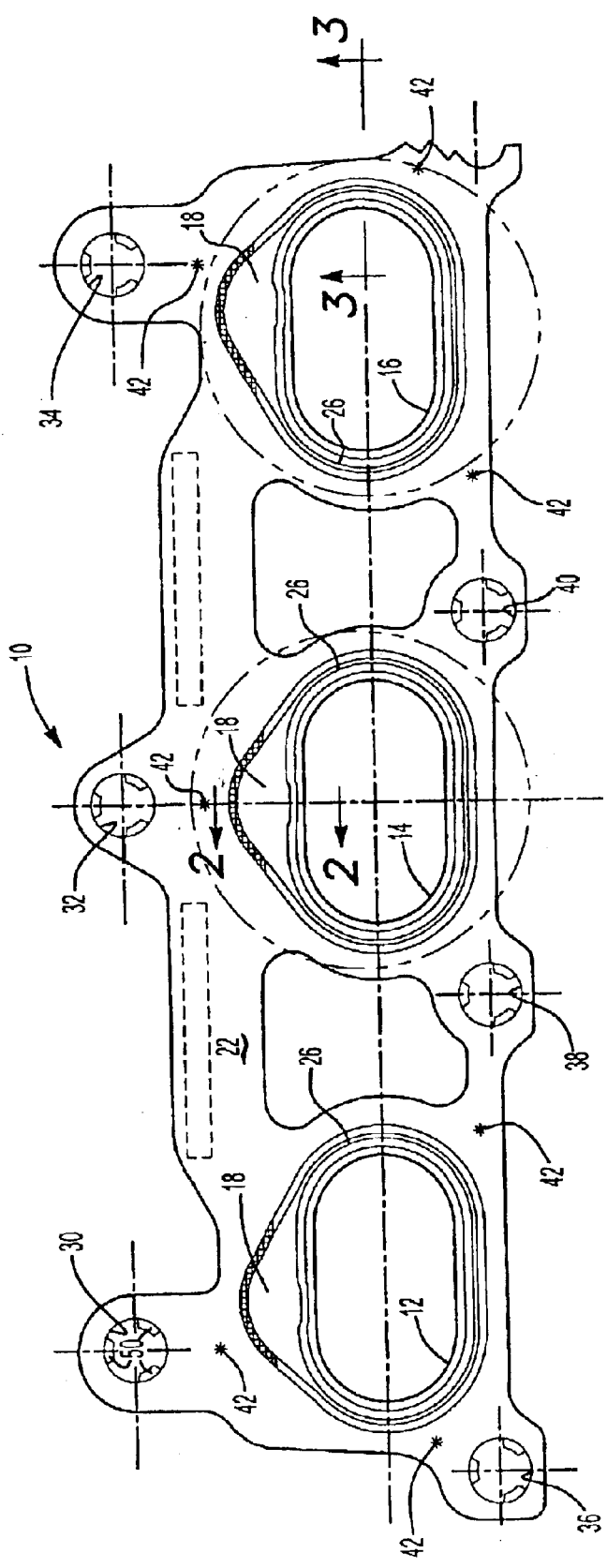
FIG. 1 is a plan view of one preferred embodiment of an exhaust manifold gasket that incorporates the bolt retention mechanism of the present invention.
Figure 3:
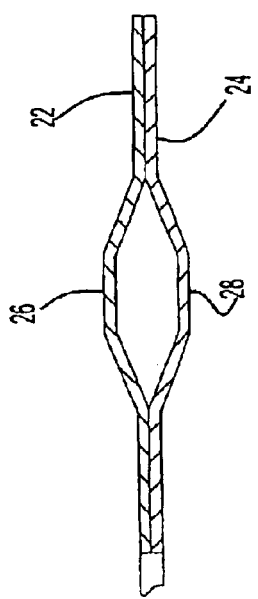
FIG. 3 is a cross-sectional view of a fragmentary portion of the same embodiment of the exhaust manifold gasket, taken along lines 3—3 of FIG. 1.
Figure 2:
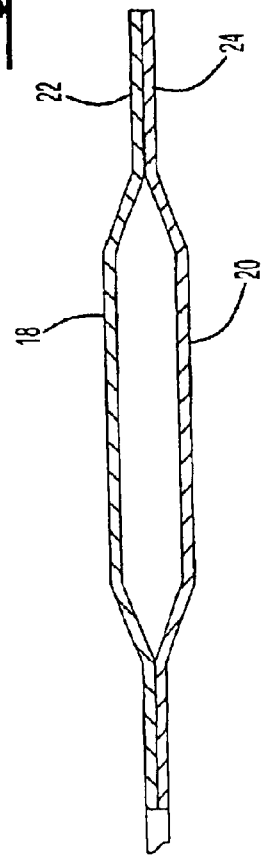
FIG. 2 is a cross-sectional view of a fragmentary portion of the same embodiment of the exhaust manifold gasket, taken along lines 2—2 of FIG. 1.

Referring initially to FIGS. 1, 2, and 3, a preferred embodiment of a multiple layered steel (MLS) exhaust manifold gasket 10 has a plurality of service apertures 12, 14, and 16, in a medial portion of the gasket body for accommodating passage of engine exhaust gases. The service apertures are bordered by relatively wide upper and lower raised sealing bead portions 18, 20 at their upper portions in a manner consistent with state-of-the-art designs of exhaust manifold gaskets. The balance of each of the service apertures is circumferentially bordered by relatively narrow upper and lower sealing bead portions 26, 28.

The body of the gasket 10 is formed in two layers; an upper or top layer 22, and a lower or bottom layer 24, as depicted (FIGS. 2 and 3). Thus, it will be appreciated that the upper sets of sealing beads 18 of the upper layer 22 are symmetrically aligned with and overlie lower mating sets of sealing beads 20 in the lower metal layer 24. Similarly, the upper sets of sealing beads 26 will be symmetrically aligned with and overlie the lower sets of sealing beads 28. The layers 22 and 24 are fixedly secured together in the described embodiment via spot welds 42 (FIG. 1).

The gasket 10 includes a plurality of identical bolt apertures 30, 32, 34, 36, 38, and 40 circumferentially spaced apart about the peripheral edge of the gasket 10 for securement of the gasket between a cylinder head exhaust port 86 (FIG. 7) of an internal combustion engine (not shown) and an exhaust manifold port 80 of an exhaust manifold (not shown) to which the port 80 is attached.

Figure 4:
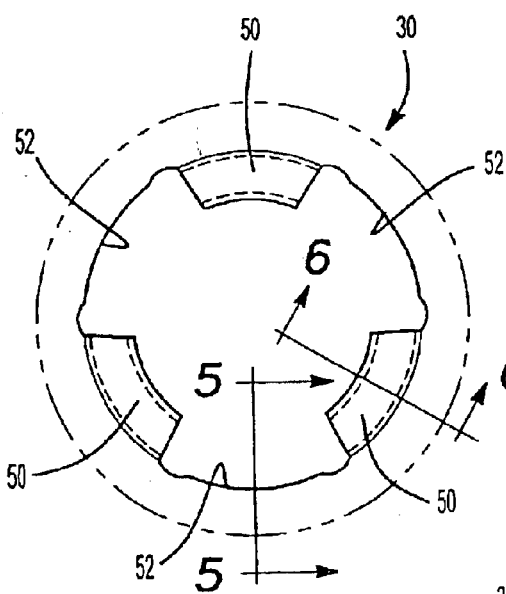
FIG. 4 is an enlarged plan view of one of the bolt apertures shown in FIG. 1.
Figure 5:
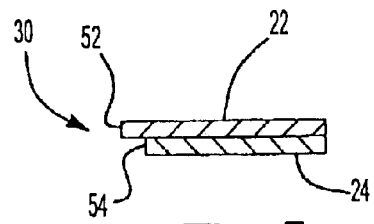
FIG. 5 is a cross-sectional view of the enlarged bolthole of FIG. 4, taken along lines 5—5 thereof.
Figure 6:
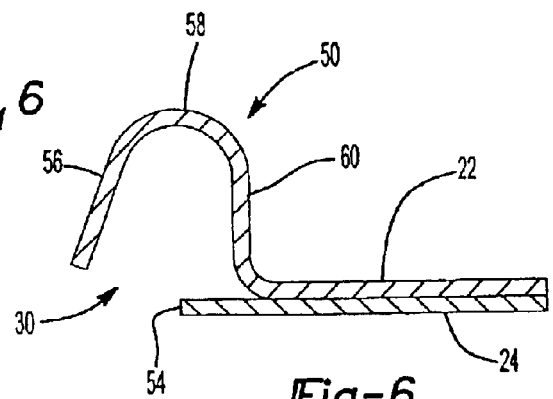
FIG. 6 is another cross-sectional view of the enlarged bolthole of FIG. 4, taken along lines 6—6 thereof.

Referring now to FIGS. 4, 5, and 6, one representative bolthole 30 of the gasket 10 is shown in greater detail. The bolthole 30 includes a plurality of tabs 50 which are in the form of inverted U-shaped tangs 50. The tabs 50 are integral to the top layer 22 of the gasket 10 as shown in FIG. 5. In the described embodiment there are three such tabs 50 (FIG. 4), though the invention would satisfactorily operate with only two of such tabs 50. Referring particularly to FIG. 6, each inverted U-shaped tang 50 includes a bolt-contacting first leg 56, a connecting trough portion 58, and a spaced second leg 60 that is held spaced from the first leg 56 via the connecting trough portion 58. Those skilled in the art will appreciate that the first and second legs 56 and 60 are substantially parallel, and are held in place together via the portion 58. It will further be noted that a boundary edge 54 of the second or bottom layer 24 extends radially under each of the tabs 50. Referring specifically to FIGS. 4 and 6, those skilled in the art will appreciate that in the space between tabs 50, distributed circumferentially spaced about the apertures 30 (FIG. 4), a boundary edge 52 of the first or top layer 22 slightly overlies the boundary edge 54 of the bottom layer 24.

Figure 7:
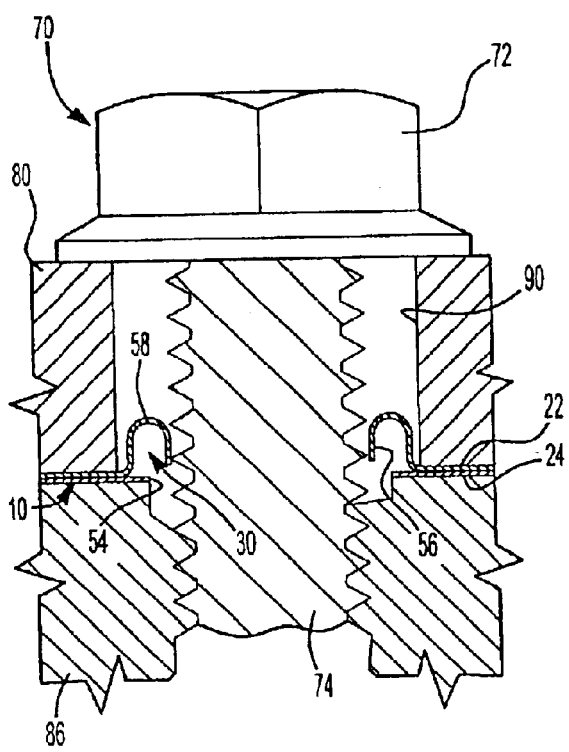
FIG. 7 is a cross-sectional view of the enlarged bolthole of FIG. 4, shown including a bolt member inserted through mated apertures of a cylinder head manifold port and an attached manifold gasket constructed in accordance with the present invention.

Referring now to FIG. 7, a portion of the gasket 10 that includes the bolt hole aperture 30 is shown as assembled between a manifold 80 and a cylinder head exhaust port 86. The aperture 30 includes the three tabs 50, as shown in FIG. 4, so only two of the tabs are visible in the cross-sectional view of FIG. 7. A bolt 70 having a head 72 and a threaded shank 74 is shown inserted through the aperture 30 as well as through a mating aperture 90 of the manifold 80. From the depiction, it is clear that the bolt contacting first leg 56 of the tab 50 frictionally engages the shank 74 of the bolt 70.

Those skilled in the art will appreciate that the typical MLS exhaust manifold gasket 10 is formed of spring steel, and preferably stainless steel. The tangs 50 are collectively sized and adapted to provide radially inwardly directed forces against the axially extending threaded shank 74 of the bolt 70. This feature provides that the manifold 80 may be assembled to the cylinder head exhaust port 86 with the gasket 10 pre-assembled to the manifold 80. In fact, the tangs 50 provide a mechanism by which the bolts 70 may simply be axially pushed into the tangs; no manual bolt rotation is required. Moreover, the mechanism is effective to retain the gasket 10 in place against the manifold 80 without the use of clips.

Those skilled in the art will appreciate that for optimal effectiveness, the aperture 90 must have a diameter greater than the diameter of the shank 74 in order to accommodate a simple push-style insertion of the shank through the aperture 90 and into the bolthole aperture 30. Moreover, the boundary edge 54 of the bottom layer 24 must have a greater diameter than the interior diameter formed by the collective bolt-contacting legs 56 of the tabs 50 to enable proper functioning of the bolt retention mechanism.

Figure 8:
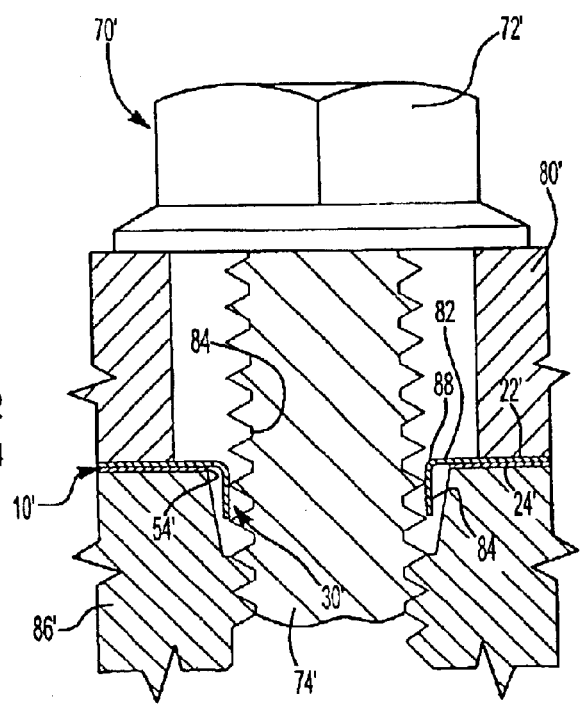
FIG. 8 is a view similar to FIG. 7 of an alternate construction of the manifold gasket.

Referring now to FIG. 8, an alternate embodiment of the gasket 10' is shown secured in place between a manifold 80' and a cylinder head exhaust port 86'. In this embodiment, the bolthole gasket 10' has a plurality of L-shaped tangs 82 circumferentially arranged similar to the inverted U-shaped tang 50 already described. As was each U-shaped tang 50 associated with the bolt apertures (e.g. bolt aperture 30), each L-shaped tang 82 (associated with bolt aperture 30' as shown) is positioned adjacent to, and in symmetrical registration with and radially inwardly of, the boundary edge 54' of the lower layer 24' of the gasket 10'. In this embodiment, however, each tang 82 is formed of a radial leg portion 88 formed by a radially inwardly extending portion of the planar gasket 10', and an axial leg portion 84 contiguous with, but depending from, the radial leg portion 88, wherein the axial leg portion 84 extends orthogonally to the radial leg portion 88, and comprises the actual bolt-contacting portion of the L-shaped tang 82.

Finally, as already suggested, the preferred metal to be used for the exhaust gasket 10, 10', hence for both of the gasket metal layers 22 and 24, is stainless steel. This is because of the high temperature ranges to which a manifold exhaust system is normally subjected. Otherwise, the gasket 10 may have a short useful life due to the corrosive effects of oxidation. A preferred choice of a relatively robust stainless steel material for the intended environment is SAE 301 stainless steel for both layers.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A gasket comprising a generally planar body formed of at least a top and a bottom layer; a plurality of apertures formed in both said top and bottom layers of said gasket, wherein at least one of said apertures of said top layer is concentrically and axially aligned with a mating aperture of said bottom layer to define a pair of axially juxtaposed mated apertures in said layers, each of said mated apertures defining a circumferential boundary edge: a bolt retainer formed in the boundary edge of at least said mated aperture in at least said top layer of said gasket; said retainer defining at least a pair of radially inwardly extending tabs, each tab defining an L-shaped tang positioned adjacent to, in symmetrical registration with, and radially inwardly of and radially spaced from, the boundary edge of said mated aperture formed in said bottom layer.

2. A gasket, as in claim 1, comprising an exhaust manifold gasket formed of two layers, each formed of steel, said layers secured together via welding, and wherein said tangs are formed of a spring steel, each tang being sized and adapted to provide radially inwardly directed forces against an axially extending threaded shank of a bolt inserted through said mated apertures.

3. A gasket, as in claim 2, wherein said top and bottom layers comprise stainless steel, and wherein each of said L-shaped tangs comprises a bolt-contacting portion extending radially inwardly of said boundary edges of associated mated apertures, wherein each bolt-contacting portion comprises a radial leg and an axial leg, the axial leg connected to and extending orthogonally to the radial leg, the axial leg portion of said tang being radially inwardly spaced from said boundary edge of said mated aperture of said bottom layer, and adapted to make frictional contact with the bolt shank.

4. A gasket, as in claim 1, wherein said L-shaped tang is formed of a radially inwardly extending radial leg portion and an axial leg portion, wherein said axial leg extends generally orthogonally from said radial leg portion and is substantially parallel to an axis of rotation defined by said mating apertures.

5. A gasket, as in claim 2, wherein said axial leg portion includes a free end adapted to engage a fastener selectively inserted within said mating apertures.

6. A gasket comprising:

a generally planar body formed of at least a top and a bottom layer;

a plurality of apertures formed in both said top and said bottom layers, wherein at least one of said apertures of said top layer is concentrically and axially aligned with at least one of said apertures of said bottom layer to define a pair of axially juxtaposed mated apertures in said layers, each of said mated apertures defining a circumferential boundary edge;

a bolt retainer formed in said boundary edge of said mated aperture in at least said top layer;

wherein said bolt retainer defines at least a pair of radially inwardly extending tabs positioned adjacent to, in symmetrical registration with and radially inwardly of said boundary edge of said mated aperture formed in said bottom layer, wherein at least one of said tabs comprises a substantially radial leg and a substantially axial leg, wherein said axial leg connects to and extends generally orthogonally from said radial leg, said axial leg being radially inwardly spaced from said boundary edges of said mated apertures.

7. A gasket, as in claim 6, comprising an exhaust manifold gasket formed of steel wherein said top and said bottom layers are secured together via welding.

8. A gasket, as in claim 6, comprising at least three tabs circumferentially arranged about said boundary edge of said mated aperture of said top layer.

9. A gasket, as in claim 6, wherein said boundary edge of said mated aperture of said bottom layer extends radially under each of said tabs.

10. A gasket, as in claim 6, wherein said top and said bottom layers each include at least one sealing bead.

11. A gasket, as in claim 10, wherein said sealing bead of said top layer is axially aligned with said sealing bead of said bottom layer.

12. A gasket, as in claim 6, wherein said tabs are integrally formed with said top layer.

13. A gasket, as in claim 6, wherein said mated apertures have a diameter greater than a diameter associated with a threaded shank of a bolt inserted through said mated apertures.

14. A gasket, as in claim 6, wherein said tabs selectively provide inwardly directed forces against an axially extending threaded shank of a bolt inserted through said mated apertures of said top and said bottom layers.

15. A gasket, as in claim 14, wherein each of said tabs comprises a bolt-contacting portion extending inwardly of said boundary edges of said mated apertures to frictionally engage the threaded shank of the bolt.

16. A gasket, as in claim 15, wherein said boundary edge of said mated aperture of said bottom layer includes a diameter greater than an interior diameter formed by said bolt-contacting portion.

17. A gasket comprising:

a generally planar body formed of at least a top and a bottom layer;

a plurality of apertures formed in both said top and said bottom layers, wherein at least one of said apertures of said top layer is concentrically and axially juxtaposed mated least one of said apertures of said bottom layer to define a pair of axially juxtaposed mated apertures in said layers, each of said mated apertures defining a circumferential boundary edge;

a bolt retainer formed in said boundary edge of said mated aperture in at least said top layer, wherein said bolt retainer defines at least pair of radially inwardly extending tabs positioned adjacent to, in symmetrical registration with and radially inwardly of said boundary edge of said mated aperture formed in said bottom layer, wherein said tabs define a generally L-shaped tang selectively providing inwardly directed forces against an axially extending threaded shank of a bolt inserted through said mated apertures of said top and said bottom layers.

18. A gasket, as in claim 17, wherein said tang comprises a bolt-contacting portion extending inwardly of said boundary edges of said mated apertures to frictionally engage the threaded shank of the bolt.

19. A gasket, as in claim 18, wherein said boundary edge of said mated aperture of said bottom layer includes a diameter greater than an interior diameter formed by said bolt-contacting portion.

20. A gasket, as in claim 18, wherein said tang comprises a radial leg and an axial leg, wherein said axial leg connects to and extends generally orthogonally from said radial leg, said axial leg of said L-shaped tang being radially inwardly spaced from said boundary edges of said mated apertures.

* * * * *